Dec. 25, 1951　　　H. C. SMITH ET AL　　　2,579,708
DUMPING MECHANISM

Filed Dec. 12, 1949　　　　　　　　　　3 Sheets-Sheet 1

Inventors
Haywood C. Smith and
James C. Petrea

By Bacon & Thomas
Attorneys

Inventors
Haywood C. Smith and
James C. Petrea

By Bacon & Thomas
Attorneys

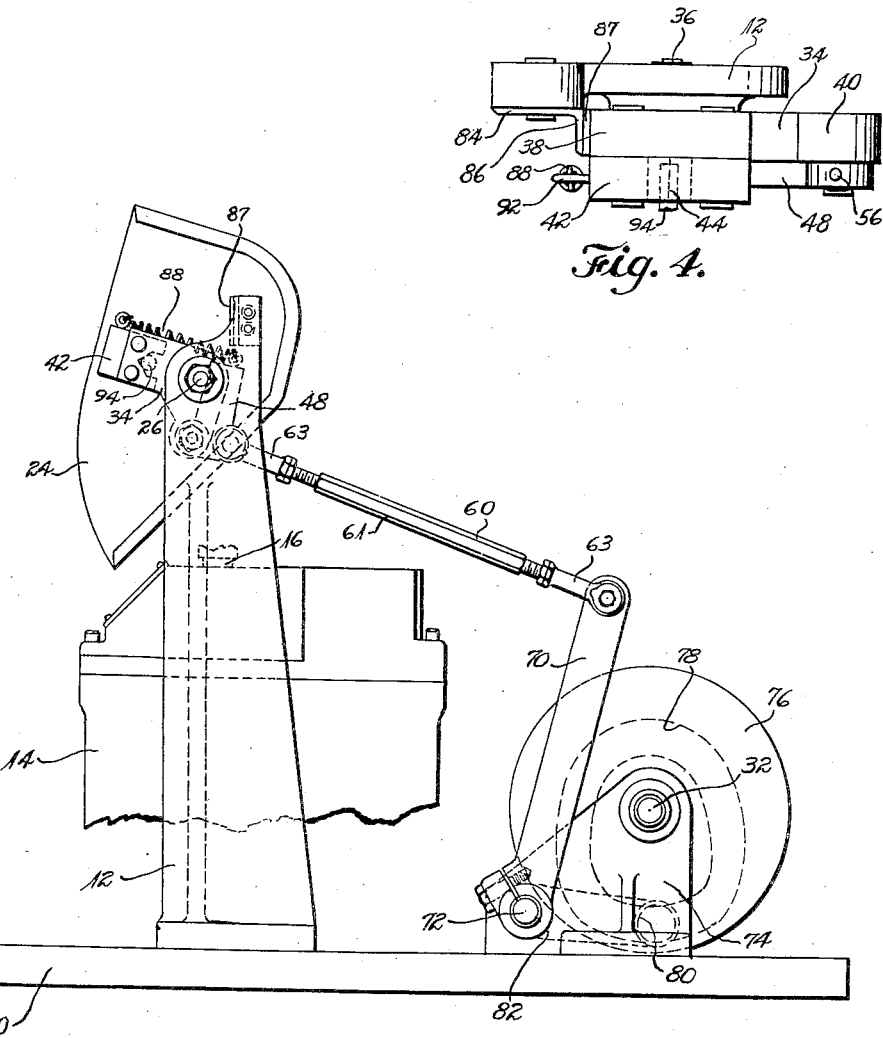

Patented Dec. 25, 1951

2,579,708

UNITED STATES PATENT OFFICE 2,579,708

DUMPING MECHANISM

Haywood C. Smith and James C. Petrea, Durham, N. C., assignors to Wright Machinery Company, Durham, N. C., a corporation of North Carolina Application December 12, 1949, Serial No. 132,442

12 Claims. (Cl. 214—2)

This invention relates to weighing machines and particularly to a dumping mechanism arranged to effect tilting of a material receiving and weighing member to effect discharge of the weighed material therefrom.

In a preferred embodiment of the present invention a weighing mechanism comprises a tank containing a fluid in which a float is buoyantly supported. A supporting member connected to the float is arranged to releasably support a material weighing bucket whereby the float moves to a lower position in the supporting fluid upon depositing of sufficient material in the bucket. When a predetermined weight of material is deposited, the float reaches a predetermined level and causes actuation of of a mechanism to dump the material from the bucket. It is this dumping mechanism that constitutes the subject matter of the present invention and is characterized by a structure pivotally supported on a frame member adjacent the bucket. The structure has means for engaging a portion of the bucket and an element pivoted thereon which is provided with means for engaging another portion of the bucket. When the element is pivoted on the structure in a predetermined manner, the bucket is gripped and held by the dumping mechanism and lifted free of support by the float and then dumped by a pivotal movement of the mechanism. A cam-actuated link drives the pivoted element only to effect all of the movements described, in a single cycle of operation. It is also contemplated that the invention include a dumping mechanism wherein all of the elements are not pivoted relative to each other and the frame but wherein some of said elements may be slidably mounted relative to others.

It is, therefore, an object of this invention to provide a weighing machine wherein a weighing bucket is supported by weight responsive means free of engagement by any other mechanism during the weighing cycle and wherein dumping means engage and lift the bucket from the weight responsive means during a dumping cycle.

It is a further object of this invention to provide, in a weighing machine, novel mechanism to lift and dump a material weighing bucket.

It is still another object of this invention to provide a weighing machine as set forth above wherein the weighing cycle is accomplished free of engagement with any dumping mechanism.

It is a still further object of this invention to provide a weighing machine of generally improved construction and operation involving simple mechanisms economical to produce.

Another object of the invention is to provide an improved dumping mechanism for a weighing machine.

Other objects and advantages of the invention will become apparent to those skilled in the art as the description proceeds in connection with the accompanying drawings wherein:

Fig. 4 is a top plan view of that portion of the mechanism shown in Fig. 3 and

Fig. 5 is a side elevational view similar to that of Fig. 1 but showing the parts in different relative positions.

Figures 1, 3:
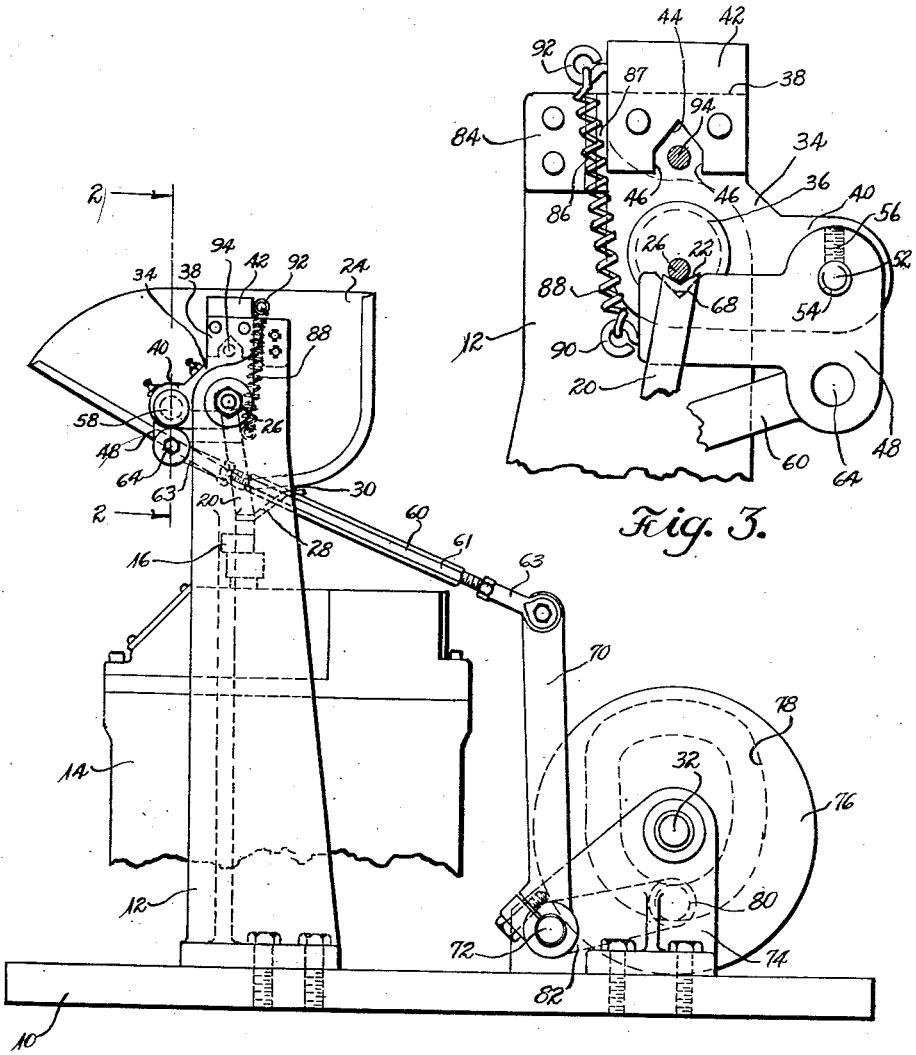
Fig. 1 is a side elevational view of a portion of a weighing machine embodying the present invention with certain parts omitted for clarity of illustration and other parts being broken away.
Fig. 3 is a sectional view of a portion of the device taken substantially on the line 3—3 of Fig. 2 when looking in the direction of the arrows.
Figure 2:
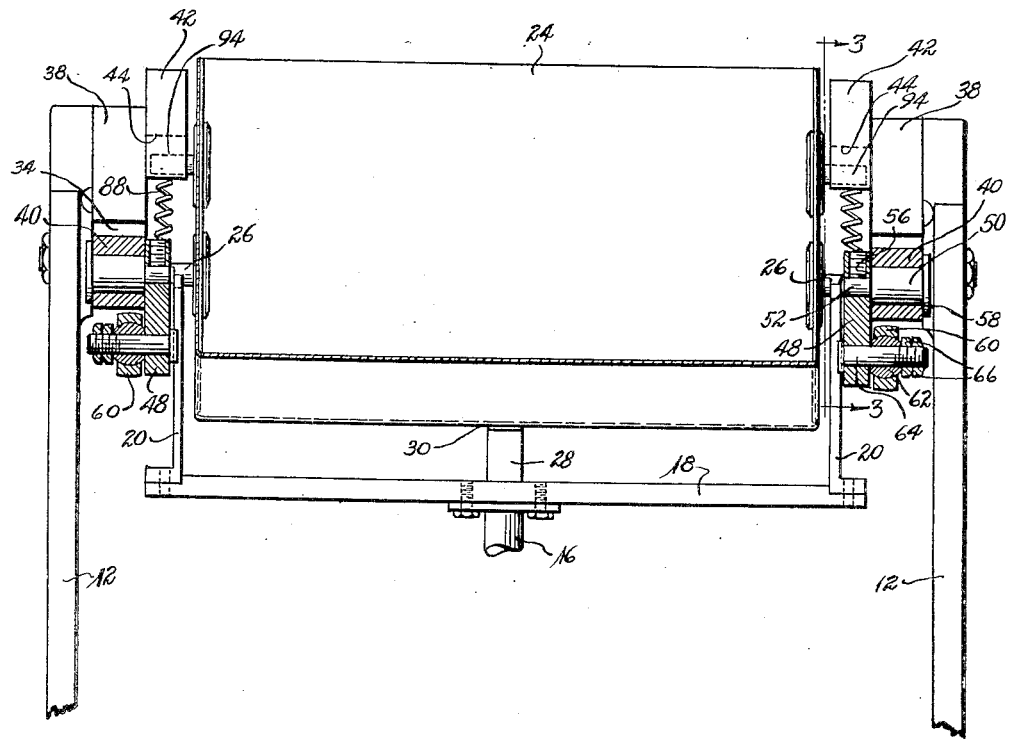
Fig. 2 is a sectional view, on a somewhat larger scale, taken substantially on the line 2—2 of Fig. 1 and looking in the direction of the arrows.

The weighing machine in which the present invention is incorporated includes a frame plate 10 having a pair of upstanding frame members 12 fixed thereon. A hollow tank 14 is fixedly supported on the machine and is constructed to be fluid-tight to retain a suitable fluid therein. A float (not shown) is buoyantly supported in the fluid within the tank 14 and is connected to an upstanding member 16 carrying at its upper end a bucket-supporting yoke comprising a cross member 18 and upwardly extending elements 20 attached to the ends of the cross member 18, as shown in Fig. 2. Each of the members 20 is provided with an upwardly open V-shaped seat 22 at its upper end and the seats 22 on the two members 20 are at substantially the same elevation. Suitable guide means (not shown) hold the member 16 in upright position during its vertical weighing movements. The weighing bucket 24 is of such dimensions that it is readily received between the upstanding members 20 and is provided at each end with an outwardly extending trunnion or pin 26 receivable in the adjacent seat 22. The trunnions or pins 26 are positioned somewhat forwardly (to the left as seen in Fig. 1) of the center of gravity of the bucket 24 so that the empty bucket normally tends to swing clockwise as seen in Fig. 1. A bracket 28 is fixed to the member 16 and extends rearwardly thereof, terminating in a pad 30 in position to engage the bottom of the bucket 24 to normally hold the bucket in an upright material receiving position. It is to be understood that the term "bucket" as employed herein and in the appended claims is intended to include any means capable of receiving material to be weighed and capable of being emptied of said material.

It is apparent, from the foregoing description, that the bucket 24 is buoyantly supported by the fluid within the tank 14 for vertical balancing movement and that a predetermined weight of material deposited within the bucket 24 will cause the float to assume a lower or balanced position in the fluid. Suitable detecting and control means (not shown) are actuated when the float reaches its lower or balanced position to cause an interruption in the feed of material to the bucket and to actuate a cam shaft 32 to effect a cycle of operations, including dumping of material from the bucket 24.

Pivoted to each upstanding frame member 12 is an L-shaped member 34 and associated dumping mechanisms. The dumping mechanism on each frame member 12 is identical to that on the other frame member, but arranged in reverse relation and only one will be described in detail.

The L-shaped member 34 is pivoted to the frame member 12 by a pivot 36 permitting the member 34 to pivot freely on a horizontal axis but restraining it against axial movement. The L-shaped member 34 includes an upwardly extending portion 38 directed upwardly from the pivot 36 and a laterally extending portion 40 extending substantially horizontally, in the normal position of the member 34, from the pivot 36. A block 42 is rigidly attached to the upwardly extending portion 38 on the inner side thereof between the portion 38 and the adjacent end of the bucket 24. The block 42 is provided with a downwardly open seat 44 in the form of a downwardly directed V notch through the bottom edge thereof and having side wall portions 46, the downwardly facing seat 44, when member 34 is in the normal position of Fig. 3, being substantially directly above the axis of pivot 36, and in substantially the same vertical plane as the trunnion 26 on the bucket 24.

Adjacent the outermost end of the horizontally extending portion 40 of member 34 a lever 48 is pivoted to the member 34. A pivot pin 50 (see Fig. 2) extends through and is journalled in the member 34 and is provided with a reduced end portion 52 positioned in an opening 54 in the lever 48. A suitable set screw or the like 56 threaded into the lever 48 engages the reduced end portion 52 to hold the lever 48 fixed to the pivot 50. A head 58 on the pivot 50 engages the outermost face of the member 34 to prevent axial movement of the pivot 50 and the lever 48 relative to the L-shaped member. As shown, the lever 48 is pivoted to the member 34 on the same side thereof as the block 42. The lever 48, however, is somewhat thinner, when measured in a direction parallel to the axis of pivots 36 and 50, than the corresponding dimension of the block 42. As clearly shown in Fig. 3, the lever 48 is of generally T shape and an upwardly extending ear thereof is provided with the opening 54 referred to. The other ear of the lever 48 extends downwardly and is pivoted, adjacent its lowermost end, to an actuating link 60. The actuating link 60 is provided with a spherical seat engaging a spherical bearing portion 62 mounted on a pivot pin 64 passing therethrough and through the lever 48. A pair of lock nuts 66 are provided to hold the parts in the described assembled relationship.

The stem of the T-shaped lever 48 extends generally horizontally toward the pivot 36 and to a position below the trunnion 26 on the bucket 24. Directly below the trunnion 26 the lever 48 is provided with an upwardly facing open seat 68 and in the position shown in Fig. 3 the seat 68 is opposed to and directly below the seat 44 in block 42. The stem portion of the lever 48 extends alongside, but clear of, the upwardly extending member 20 which supports the trunnion 26 during weighing movements.

Each of the levers 48 is provided with an actuating link 60 pivoted thereto at one end and pivoted at its opposite end to one of a pair of arms 70, only one of which is shown, fixed to a rock shaft 72 journalled in brackets 74 carried by the frame plate 10. The cam shaft 32, previously referred to, is also journalled in the brackets 74 and has fixed thereon a cam 76 having a closed cam track 78 in one face thereof. A cam follower 80 extends into the cam track 78 and is carried by one end of a cam lever 82, also fixed to the rock shaft 72. The cam follower 80 is preferably in the form of a laterally extending roller journalled on the free end of the lever 82. It will be apparent that a rotation of the cam shaft 32 and the cam 76 will cause a cycle of rocking movement of the shaft 72 and a cycle of reciprocation of the links 60. Each of the links 60 may comprise a plurality of parts threadedly engaged with each other to vary the effective length of the links, all in a well-known manner and as clearly shown in Figs. 1 and 5 of the drawings wherein a central portion 61 is shown threaded at its ends into end members 63. Lock nuts 65 retain the parts against accidental displacement.

Referring now to Figs. 3 and 4, the upwardly extending frame members 12 are provided, adjacent the top ends thereof, with angle brackets 84 fixed thereto and having flange portions 86 extending inwardly toward the bucket 24 and across the path of movement of the L-shaped member 34. Each of the flanges 86 is provided with a buffer or pad 87 to be engaged by one edge of the upwardly extending portion 38 of the member 34 when that portion is in an upright position as indicated in Fig. 3. The brackets 84 and pads 87 thus constitute stop means limiting pivotal movement of the members 34 in one direction about their pivots 36. A tension spring 88 is fixed at one end, by means of an eyelet 90, to the free end of the stem of the T-shaped lever 48 and engages, at its other end, an eyelet 92 fixed to the block 42 on the member 34. As is evident from Fig. 2, the spring 88 extends upwardly along a path between the innermost edge of the flange 86 of bracket 84 and the outermost end of the bucket 24 whereby the assembly comprising member 34 and lever 48 may pivot about the axis of 36 without interference between the spring 88 and the bracket 84.

The bucket 24 carries second trunnions 94 at each end thereof vertically spaced the same fixed distance above the previously described trunnions 26. The trunnions 94 extend outwardly of the bucket 24 past the innermost edge of the block 42 to lie in opposed relation to and below the seats 44 but between the side walls 46.

The cam 76 having the closed cam track 78 is, in an obvious manner, effective to positively position the levers 48 in predetermined position (that shown in Fig. 3) in the normal or stopped position of the cam 76. Under such conditions the pivots 64, between the links 60 and the levers 48, may be considered as being temporarily fixed to the frame of the machine, which is the "normal" position referred to and is the position of the parts during a weighing cycle. Considering the pivot 64 so fixed it will be clear that the spring 88, acting along a line on the same side of the axis of 36 as the stop 87, will urge the member 34 to turn counter-clockwise about its pivot 36 (as seen in Fig. 3) and against the stop member 87. The parts will thus normally be held fixed in the position shown in Fig. 3 with the seats 44 and 68 a fixed distance apart, in vertical alignment with each other, and in vertical alignment with the trunnions 26 and 94.

At the commencement of a weighing cycle, the float, previously referred to, is held by stop means (not shown) to a position just slightly above that it assumes under the influence of a predetermined weight of material in the bucket 24. Thus the weighing mechanism is "preloaded" and downward movement of the bucket and float does not take place until the weight of material in the bucket is nearly equal to the predetermined desired weight. After that weight of material has been accumulated in the bucket 24 and downward movement begins, the trunnions 94 and 26 may move downwardly, as seen in Fig. 3, a substantial distance without engaging the trunnion 26 with seat 68. At the lowermost position of the bucket and float, the trunnion 26 is still a short distance above the seat 68 in lever 48 and in this position control means, referred to previously but not shown, initiate operation of mechanism to cause a single revolution of the cam shaft 32. As the cam shaft 32 rotates the cam track 78 will cause the link 60 to oscillate from the position shown in Fig. 1 to that shown in Fig. 5 and back to the Fig. 1 position during one revolution of the cam. At the completion of the one revolution the cam shaft is again stopped until the bucket 24 has again accumulated the predetermined weight of material.

Movement of the link 60 to the right as seen in Fig. 1 will be evident in Fig. 3 as movement of that link 60 to the left. Considering Fig. 3, movement of the link 60 to the left will cause the lever 48 to swing about the pivot 52 in a clockwise direction. The L-shaped member 34 is held against the stop 87 by spring 88, thus maintaining the pivot 52 in fixed position during the initial part of the dumping cycle. Clockwise rotation of the lever 48 results in first lifting the seat 68 thereon into engagement with the trunnion 26 and further movement lifts the trunnion 26, the bucket 24 and the trunnion 94 upwardly. The yoke 20 follows the upward movement of the trunnion 26 for a short distance until the stop means previously referred to become effective to limit upward movement of the float. Upward movement of the yoke 20 is stopped by said stop means before the trunnion 94 has moved upwardly far enough to engage the seat 44. Thus the trunnion 26 is lifted completely free of the yoke 20 and the bucket and its contents are supported entirely by the lever 48. The spring 88 is provided with sufficient initial tension to remain under substantial tension at all times, even when the lever 48 has been swung clockwise sufficiently to engage the trunnion 94 in the seat 44. Thus the member 34 is maintained in contact with the stop 87 until that time. The trunnions 26 and 94 are both rigidly carried by the bucket 24 a fixed distance apart so it will be obvious that upon engagement of the trunnion 94 with the seat 44, further clockwise movement of the lever 48 about the pivot 52 is prevented. At this time the link 60 is continuing its movement to the left and since the lever 48 cannot pivot on 52, the entire structure, lever 48, member 34, and the bucket 24, will be swung as a unit about the axis of the pivot 36 in a clockwise direction as seen in Fig. 3 to the position shown in Fig. 5, which is the dumping position of the bucket. Suitable receiving means not shown, are provided to receive the material thus dumped from the bucket. The position in Fig. 5 is attained after one-half revolution of the cam shaft 32. The other half of the single revolution of the shaft 32 merely returns the parts to the position of Figs. 1 and 3, reversing the sequence of movements just described.

As previously described, the stem 16 has a bracket 28 and pad 30 thereon to normally hold the bucket 24 in upright position. When the weight of the bucket is supported entirely by the trunnion 26 resting on the seat 68 of lever 48, and the bucket is lifted free of the yoke 20, the pad 30 will obviously be no longer effective to insure maintenance of the bucket in upright position. It is quite likely that the bucket would then be unbalanced, due to the indeterminate position of the material therein, and would tend to tilt as it is lifted free of the yoke 20. To prevent such tilting, or at least limit the tilting to a small amount, the seat 44 is provided with downwardly extending side wall portions 46, previously described. In all vertical positions of the bucket 24, the trunnion 94 is within the space between the side walls 46 but is free to move vertically therebetween without interference and to be guided into the apex of the seat 44, as described.

It is not necessary, for proper operation of the dumping mechanism, that the trunnion 26 be lifted clear of the yoke 20. The parts can be so dimensioned and related that the axis of the trunnion 26 coincides with the axis of the pivot 36 when the trunnion 94 engages the seat 44. With such an arrangement the yoke 20 could be permitted to follow the trunnion 26 upwardly and during the actual dumping movement the trunnion 26 would merely rotate on its axis. There would be no lateral movement of the trunnion 26 and no tendency for it to laterally displace itself from the seat 22 on yoke 20.

Although a single preferred embodiment of the invention is shown and described herein, it is to be understood that further modifications may be resorted to without departing from the scope of the invention as defined by the appended claims.

We claim:

1. In a weighing machine, receiving means to receive material to be weighed, means supporting said receiving means for balancing movement under the influence of material therein and for pivotal dumping movement relative thereto about a substantially horizontal axis, means normally free of engagement with said receiving means during said movement, said last-named means being movable into position to engage said receiving means and being further movable to impart a dumping movement thereto about said substantially horizontal axis.

2. In a weighing machine, a bucket to receive material to be weighed, movable means supporting said bucket for movement therewith to a predetermined position, dumping means normally out of engagement with said bucket during movement thereof to said position, said dumping means being movable into supporting engagement with said bucket and further movable to tilt said bucket about an axis passing therethrough while said bucket is supported thereby.

3. In a weighing machine, a bucket to receive material to be weighed, said bucket having a pair of support elements thereon, movable means engaging said support elements and supporting said bucket for vertical weighing movement between predetermined positions, dumping means normally out of engagement with said bucket and support elements during said weighing movement, said dumping means including relatively movable elements adapted to grip said support elements and lift the said bucket from said supporting means, said dumping means being further movable to tilt said bucket about an axis substantially coincident with a line joining said support elements and dump the contents thereof while said bucket is free of said supporting means.

4. In a weighing machine, a bucket to receive material to be weighed, movable means supporting said bucket for vertical weighing movement between predetermined positions, said supporting means having an upwardly open seat, a first trunnion on said bucket engageable on said seat for supporting said bucket thereon, a second trunnion on said bucket spaced from said first trunnion, a dumping mechanism having relatively movable elements normally free of engagement with said trunnions during said weighing movement, said elements being relatively movable, when said bucket is in its lowermost position, to engage said trunnions, respectively, and thereby grip and lift said bucket from said seat, said elements being further movable, as a unit, while gripping said trunnions therebetween, to tilt said bucket and dump the contents therefrom.

5. In a weighing machine, a frame, a bucket to receive material to be weighed, means vertically movable on said frame and having an open seat thereon, a first portion of said bucket removably engageable in said seat for supporting said bucket thereon for vertical weighing movement therewith between an upper and a lower position, a second portion of said bucket spaced from said first portion, a first member movably mounted on said frame and having a portion defining an open seat adjacent said second portion of said bucket, a second member movable relative to said frame and having an open seat adjacent a portion of said first portion of said bucket, said second member being movable to engage its seat with said first portion of said bucket and lift said bucket free of said supporting means and to seat said second portion of said bucket in said open seat of said first member to thereby grip said bucket between said members, said members being further pivotally movable as a unit about a common axis on said frame, to dump the contents from said bucket.

6. In a weighing machine, a frame, a bucket to receive material to be weighed, means vertically movable on said frame and having an upwardly open seat thereon, a first trunnion on said bucket removably engageable in said seat for supporting said bucket thereon for vertical weighing movement therewith between an upper and a lower position, a second trunnion on said bucket spaced above said first trunnion, a first member movably mounted on said frame and having a portion presenting a downwardly facing seat above said second trunnion, a second member movably mounted on said first member and having an upwardly facing seat spaced below a portion of said first trunnion, said second member being movable upwardly to engage said first trunnion and lift said bucket free of said supporting means and to seat said second trunnion in said downwardly facing seat to thereby grip said bucket between said members, said members thereafter being movable as a unit on said frame, to dump the contents from said bucket.

7. In a weighing machine, a frame, a bucket to receive material to be weighed, means vertically movable on said frame and having an upwardly open seat thereon, a first trunnion on said bucket removably engageable in said seat for supporting said bucket thereon for vertical weighing movement therewith between an upper and a lower position, a second trunnion on said bucket spaced above said first trunnion, a first member pivoted to said frame and having a portion presenting a downwardly facing seat above said second trunnion, a second member pivoted to said first member on an axis horizontally spaced from the pivot axis of said first member and from said first trunnion, said second member including a portion defining an upwardly facing seat below said first trunnion, means normally holding said members in a predetermined relative position wherein said bucket is free to move vertically between said positions without engaging said trunnions on said seats, said holding means being operable to swing said second member about its pivot axis to engage its seat with said first trunnion and to then lift said trunnion and bucket free of said supporting means and engage said second trunnion with said seat on said first member whereby to grip and support said bucket between said members for pivotal dumping movement about the pivot axis of said first member.

8. A weighing machine as defined in claim 7, including stop means on said frame to limit pivotal movement of said first member in one direction, and resilient means urging said first member against said stop means.

9. A weighing machine as defined in claim 7, including stop means on said frame to limit pivotal movement of said first member in one direction, a tension spring connecting said first and second members and arranged to urge the second member to pivot on the first member to bring the seats thereon toward each other, and operating means including a reciprocable link pivoted to said second member to pivot said members as a unit to dump said bucket when reciprocated in one direction and to return said bucket to upright position with said first member against said stop means and to further swing said second member on said first member to separate said seats and lower the said bucket onto said supporting means when reciprocated in the other direction.

10. A device as set forth in claim 9, including a closed cyclically operable cam arranged to reciprocate said link.

11. In a weighing machine, a frame, a member pivoted to said frame on a substantially horizontal first axis and having portions extending upwardly and laterally from said axis, stop means on said frame engaging said upwardly extending portion on the side thereof opposite said laterally extending portion, a lever pivoted to the said laterally extending portion of said member on a second axis substantially parallel to said first axis, said lever extending toward said first axis, said upwardly extending portion having a downwardly facing first seat thereon and said lever having an upwardly facing seat thereon below and opposed to said first seat, control means connected to said lever eccentric to both said axes and cyclically movable in a plane normal to said axes, resilient means urging said lever to swing on said member to cause said seats to approach each other and to urge said member against said stop means, weight sensitive means vertically movable on said frame between upper and lower positions, a weighing bucket supported by said weight sensitive means, portions of said bucket extending between said seats for vertical weighing movement therebetween, said control means normally holding said seats spaced apart a distance such that said portions of said bucket do not engage said seats at either of said upper or lower positions, but being operable to move said seats toward each other and grip said portions of said bucket therebetween.

12. A weighing machine as defined in claim 11, wherein said resilient means comprises a tension spring connecting said lever and said upwardly extending portion, said spring acting on a line passing to one side of said first axis and on the same side thereof as said stop means.

HAYWOOD C. SMITH.
JAMES C. PETREA.

REFERENCES CITED

The following references are of record in the file of this patent:

UNITED STATES PATENTS

| Number | Name | Date |
|--------|------|------|
| 1,149,079 | Popow | Aug. 3, 1915 |